United States Patent [19]

Hancock et al.

[11] Patent Number: 5,209,512
[45] Date of Patent: May 11, 1993

[54] APPARATUS FOR CONNECTING ADJUSTABLE REACH STEERING COLUMN TO ACTUATING MEANS

[75] Inventors: Michael T. Hancock, Coventry; Laurence G. Barton, Leamington, both of England

[73] Assignee: The Torrington Company, Torrington, Conn.

[21] Appl. No.: 819,698

[22] Filed: Jan. 13, 1992

[30] Foreign Application Priority Data

Jan. 28, 1991 [GB] United Kingdom ............. 9101801

[51] Int. Cl.$^5$ ............................................. B62D 1/18
[52] U.S. Cl. ................................ 280/775; 188/67; 74/493
[58] Field of Search ........... 280/775, 777; 188/67; 74/492, 493; 254/104; 29/263; 403/341, 12

[56] References Cited

U.S. PATENT DOCUMENTS 3,742,563 7/1973 Braun ................................ 188/67
5,009,120 4/1991 Iseler et al. ...................... 280/775

FOREIGN PATENT DOCUMENTS 3544345 7/1986 Fed. Rep. of Germany ...... 280/775
3642437 12/1986 Fed. Rep. of Germany .
2633579 1/1990 France .

Primary Examiner—Karin L. Tyson
Attorney, Agent, or Firm—Michael H. Minns

[57] ABSTRACT

A vehicle steering column incorporates a device to allow manual reach adjustment of the steering column. Actuating means is provided to pull the steering wheel away from the driver in the event of an impact of the vehicle. Two legs, slidably connected to the steering column and one of the legs connected to a pulling cable of the actuating means, each have along one edge ramps and along the opposite edges have serrated portions. One leg is inverted relative to the other so that they mate with the ramps of one leg nesting in valleys defined by the ramps of the other leg. A shear element normally secures the legs. The legs are located by two guide rails in a serrated block assembly with its serrations lying closely adjacent but normally clear of leg serrations. Upon vehicle impact, the cable is pulled and one leg tries to separate from the other leg, the shear element breaks and the serrations on the legs lock into the serrations of the serrated block assembly. Further pulling continues to pull the whole assembly.

7 Claims, 2 Drawing Sheets

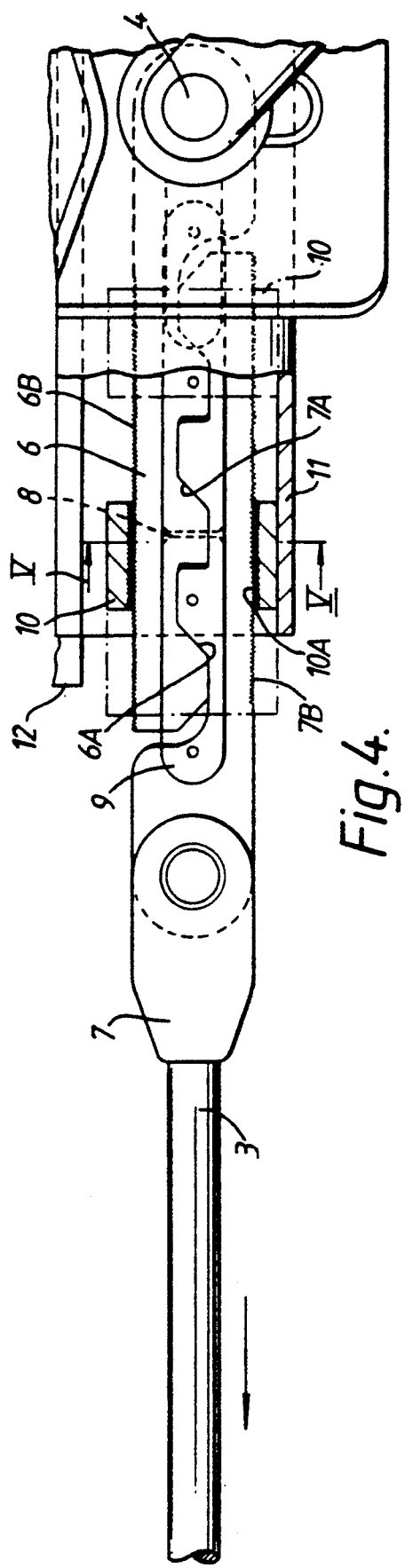
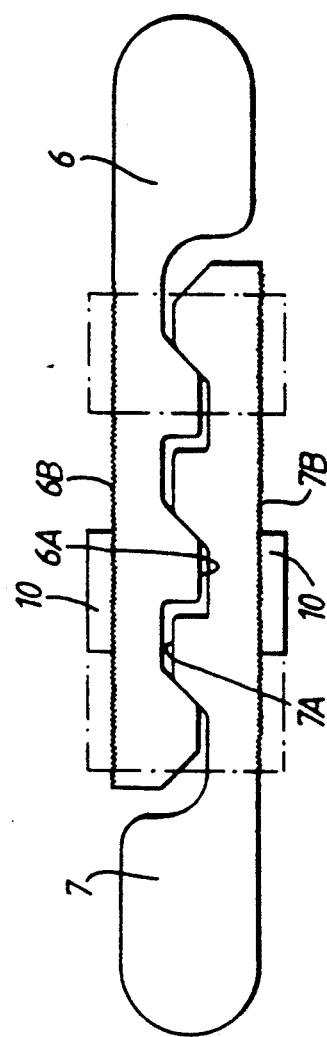
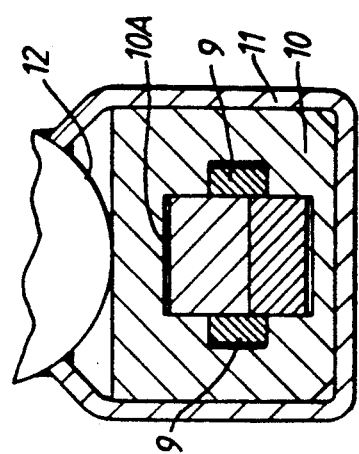

APPARATUS FOR CONNECTING ADJUSTABLE REACH STEERING COLUMN TO ACTUATING MEANS

BACKGROUND OF THE INVENTION

This invention relates generally to steering columns which are moved away from the driver in the event of an impact of the vehicle and more particularly to adjustable reach steering columns.

An actuating means is known which is designed to pull a steering column away from the driver in the event of an impact of the vehicle. The actuating means acts in such a manner to pull the steering wheel away from the driver.

When this actuating means is used in conjunction with an adjustable reach steering column, it is possible for the upper adjustable portion of the steering column to move axially away from the lower portion when the actuating means is actuated. This can increase the hazards to the vehicle occupants.

The foregoing illustrates limitations known to exist in present adjustable reach steering columns. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a coupling for an adjustable reach steering column for a vehicle, the coupling connecting the steering column to actuating means, the coupling comprising a first member slidably connected to the steering column, in such a manner as to allow axial adjustment of the steering column relative to the first member; a second member connected to the safety means; and a locking means for preventing axial movement of the steering column relative to the first member, the locking means operating upon actuation of the actuating means.

The foregoing and other aspects will become apparent from the following detailed description of the invention when considered in conjunction with the accompanying drawing figures.

BRIEF DESCRIPTION OF THE DRAWING FIGURES

FIG. 4 is an enlarged side view of the apparatus according to the invention before activation caused by impact of the vehicle;

FIG. 5 is a diagrammatic sectional view taken on the line V—V in FIG. 4; and

FIG. 6 is a view of part of the apparatus shown in FIG. 4 after activation caused by vehicle impact.

DETAILED DESCRIPTION

Figure 3:
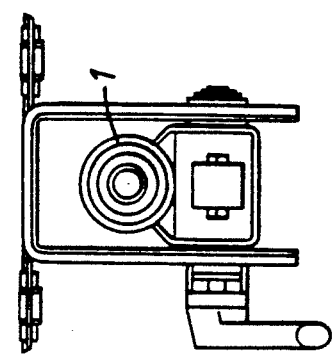
FIG. 3 is an end view viewed generally on the line III—III in FIG. 2.
Figure 1:
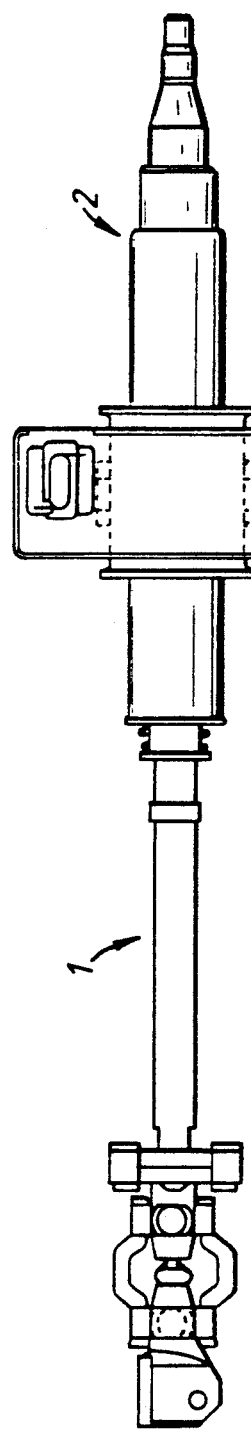
FIG. 1 is a plan view of a vehicle steering column incorporating manually operable means to adjust the reach of the steering column.

An actuating means is known which is designed to pull a steering wheel column away from the driver in the event of an impact of the vehicle. The actuating means acts in such a manner as to pull the steering wheel away from the driver.

It is an object of the present invention to provide an apparatus in which such actuating means can be used with a steering column which has an adjustable reach facility, i.e., which can be moved manually axially of itself by the driver to suit the comfort of the driver.

According to the present invention, there is provided an apparatus for connecting an adjustable reach steering column to the actuating means, i.e. means for moving, in use, the steering column away from a driver in the event of an impact of the vehicle in which the steering column is mounted. The apparatus having a first member for connection to the steering column in such manner as to allow axial adjustment of the steering column relative to said first member and a second member for connection to the actuating means, the two members incorporating a locking device which acts to prevent relative axial movement between the steering column and said first member upon actuation of the actuating means upon vehicle impact thereby to allow the actuating means to act as intended on the steering column.

The first member and the second member are preferably in the form of two flat legs which are substantially identical. Each leg has serrations along at least part of the length of one edge thereof and ramp portions along the opposite edge. The legs are so arranged that, when one of the legs is inverted relative to the other, the two members can mate together by means of their ramps.

It is, therefore, the outer edges of the two legs which are provided with the serrations and the two legs are mounted in a serrated block assembly and located by guide rails. The serrated block assembly is of such dimensions that its serrations and the serrations on the two legs do not normally interfere with one another, i.e., there is a small clearance between them.

A shear element can be provided interconnecting the two legs to keep them normally in a nesting relationship with one another.

The block assembly is fixed so that, upon vehicle impact, the second member is pulled by the actuating means and this causes the shear element to shear, thereby allowing the ramps of the leg of the first member to ride up over the ramps of the leg of the second member thereby to engage the serrations of the two legs with the serrations of the block assembly. Thus the first and second members, along with the steering column to which the first member is connected, are caused to be pulled by the actuating means.

Referring to the drawings, a vehicle steering column 1 incorporates a device 2 which allows the steering column to be manually adjusted by the driver in terms of reach to obtain the most comfortable position of the steering wheel for the driver concerned. This adjustable reach apparatus is known and will not be described further.

Figure 2:
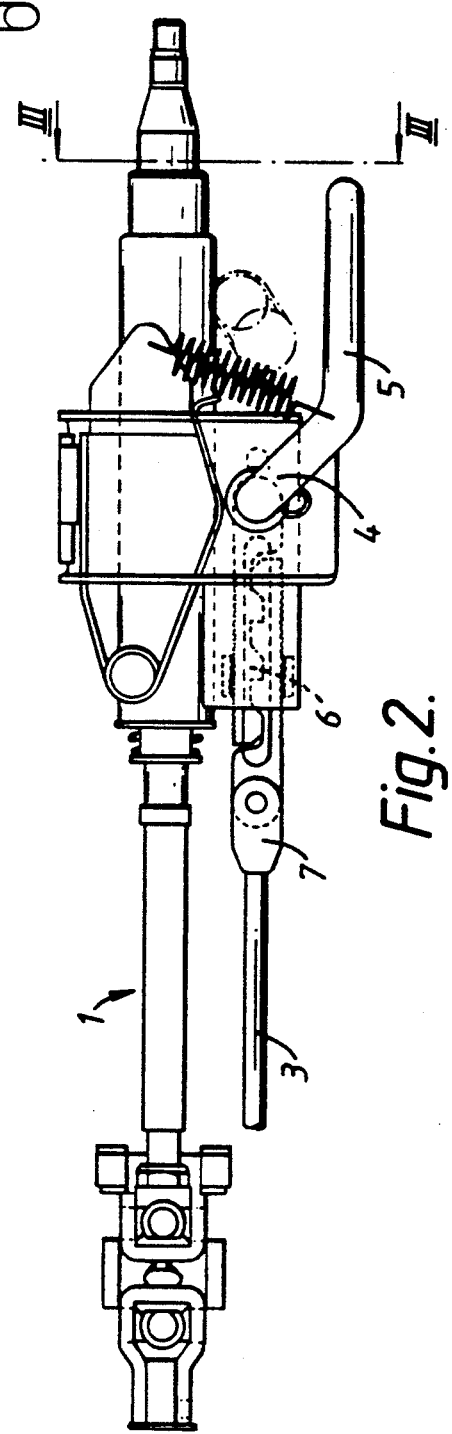
FIG. 2 is a side view of the steering column shown in FIG. 1 incorporating an apparatus according to the present invention.

Also known is an actuating means to pull the steering wheel away from the driver in the event of an impact of the vehicle. Again, it is not necessary to describe details of this further, save for the fact that part of the actuating means is a cable 3 which is connected at one end to the steering column 1 and which is pulled by another part of the actuating means in the event of vehicle impact. In FIGS. 2 and 4, the cable 3 is pulled to the left.

The apparatus according to the present invention incorporates a first member 6 which is anchored to the steering column assembly and, in the embodiment illustrated, is anchored to a lock handle bolt 4 of a lock handle 5 and a second member 7 which is anchored to the pulling cable 3.

In more detail, as best viewed in FIGS. 4 to 6, the apparatus comprises two legs 6 and 7 which are substantially identical. Each leg has along one edge a series of ramps 6A, 7A, respectively. The opposite edges of each leg have serrated portions 6B and 7B, respectively. As shown in FIG. 4, when one leg is inverted relatively to the other, the two legs will mate with the ramps 6A nesting in valleys defined by the ramps 7A. The two legs 6 and 7 are held together in nesting relationship by a shear element 8 welded or otherwise secured to the legs. The legs 6 and 7 are located by two guide rails 9 in a serrated block assembly 10 with its serrations 10A lying closely adjacent but normally clear of the serrations 6B and 7B along part of the length of the serrations on the legs 6 and 7.

The serrated block assembly 10 is fixed in a bracket 11 which is welded or otherwise joined to an outer tube 12 forming part of the steering column itself. The tube 12, bracket 11 and the block assembly 10 are normally allowed to be adjustable in a linear direction over some 60 mm. Because of the clearance, which is about 0.6 mm either side of the leg serrations 6A and 7B, the assembly of the tube, bracket and block can be adjusted over the legs 6 and 7 as, for example, shown by an alternative position indicated in dashed lines in FIG. 4. At all times, however, the serrations 10A lie close to some of the serrations 6B and 7B. As already mentioned, one end of the leg 7 is attached to one end of the crash pull cable 3 and the end of the leg 6 remote from the end of the leg 7 just mentioned is anchored to the lock handle bolt 4.

Referring to FIG. 6, when the vehicle experiences impact, the actuating means for moving the steering column away from the driver is activated by sudden pulling on the cable 3. The leg 7, with its ramps which are at about 45°, tries to separate from the leg 6. The shear element 8 breaks and the leg splines or serrations 6B and 7B lock into the splines or serrations 10A of the serrated block assembly 10. Further pulling effort by the cable 3 continues to pull the whole assembly coupled to the steering column, including the two legs 6 and 7, the block assembly 10, the bracket 11 the tube 12 and the lock handle bolt 4.

Having described the invention, what is claimed is:

1. In combination, a coupling for an adjustable reach steering column for a vehicle, the coupling connecting the steering column to an actuating means, the coupling comprising:
   a first member slidably connected to the steering column, in such a manner as to allow axial adjustment of the steering column relative to the first member;
   a second member connected to the actuating means; the first member and the second member being flat legs, each leg having serrations along at least part of the length of one edge thereof and ramp portions along the opposite edge, one leg being inverted relative to the other so that the legs mate with the ramps of one leg nesting between the ramps of the other leg; and
   a locking means for preventing axial movement of the steering column relative to the first member, the locking means operating upon actuation of the actuating means.

2. The coupling according to claim 1, wherein the locking means comprises:
   a block assembly having a slot therein, the flat legs being slidably mounted int eh slot, the edges of the slot adjacent the serrations on the legs having serrations thereupon, the dimensions of the slot being slightly greater than the dimensions of the two legs so that the slot serrations and the leg serrations do not normally interfere with one another.

3. The coupling according to claim 2 wherein the block assembly is fixed so that, upon vehicle impact, the second member is pulled by the actuating means, thereby allowing the ramps of the first member to ride up over the ramps of the second member, thereby causing the leg serrations to engage the slot serrations.

4. The coupling according to claim 1 wherein a shear element is provided interconnecting the two legs to keep them normally in a nesting relationship with one another.

5. In combination, a coupling for an adjustable reach steering column, the coupling connecting the steering column to an actuating means, the coupling comprising:
   a pair of legs, each leg having a plurality of ramps along one edge and having a serrated portion along the opposite edge, one leg being inverted relative to the other so that the legs mate with the ramps of one leg nesting between the ramps of the other leg; and
   a block assembly having a slot therein, the pair of legs being slidably mounted in the slot, and the edges of the slot adjacent the serrated portion of the legs also having serrations thereupon, the block assembly being connected to the steering column;
   one end of one leg being connected to the actuating means.

6. The coupling according to claim 5 wherein the legs are flat.

7. The coupling according to claim 5 wherein a shear element is provided interconnecting the two legs to keep them normally in a nesting relationship with one another.

* * * * *